(12) United States Patent
Kim

(10) Patent No.: US 6,505,040 B1
(45) Date of Patent: Jan. 7, 2003

(54) METHOD OF MAKING A MULTIPARTY CONFERENCE CALL ON A MOBILE PHONE

(75) Inventor: Ji-Young Kim, Kyonggi-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/475,685

(22) Filed: Dec. 30, 1999

(30) Foreign Application Priority Data

Dec. 30, 1998 (KR) .................................. 60776

(51) Int. Cl.[7] ............................ H04M 3/42; H04L 12/16
(52) U.S. Cl. ....................... 455/416; 455/414; 370/260; 370/261
(58) Field of Search ................................ 455/417, 406, 455/413, 414, 418, 419, 422, 550, 421, 416; 370/260, 261

(56) References Cited

U.S. PATENT DOCUMENTS 5,764,731 A * 6/1998 Yablon ..................... 379/88.15
6,295,447 B1 * 9/2001 Reichelt et al. ............. 455/417
6,298,045 B1 * 10/2001 Pang et al. ................. 370/261

* cited by examiner

*Primary Examiner*—Edward F. Urban
*Assistant Examiner*—Sheila Smith
(74) *Attorney, Agent, or Firm*—Dilworth & Barrese, LLP

(57) ABSTRACT

A method of making a mobile phone invite multiple remote parties for a multiparty conference through a mobile phone service network, comprises the steps of setting the mobile phone to a multiparty conference mode, searching a subscriber table in which are stored the multiple remote parties to find out what phone numbers to call; transmitting a set-up command asking for connection of the first remote party to the network; holding the connection upon receiving its confirmation from the network; transmitting another set-up command asking for connection of the next remote party to the network; transmitting a multiparty conference request (MPTY request) to the network to join the present active call of the next remote party with the previous call, now holding, of the first remote party upon receiving the confirmation of the next remote party's connection; holding the joined call of the first and next remote parties; repeating the previous fifth to seventh steps until joining the last remote party; and commencing the multiparty conference.

4 Claims, 4 Drawing Sheets

METHOD OF MAKING A MULTIPARTY CONFERENCE CALL ON A MOBILE PHONE

BACKGROUND OF THE INVENTION

1. Field of the Invention

The present invention relates to a mobile phone, and more particularly, to a method of making a multiparty conference call for conferring with multiple parties on a mobile phone.

2. Description of the Related Art

Figure 1A:
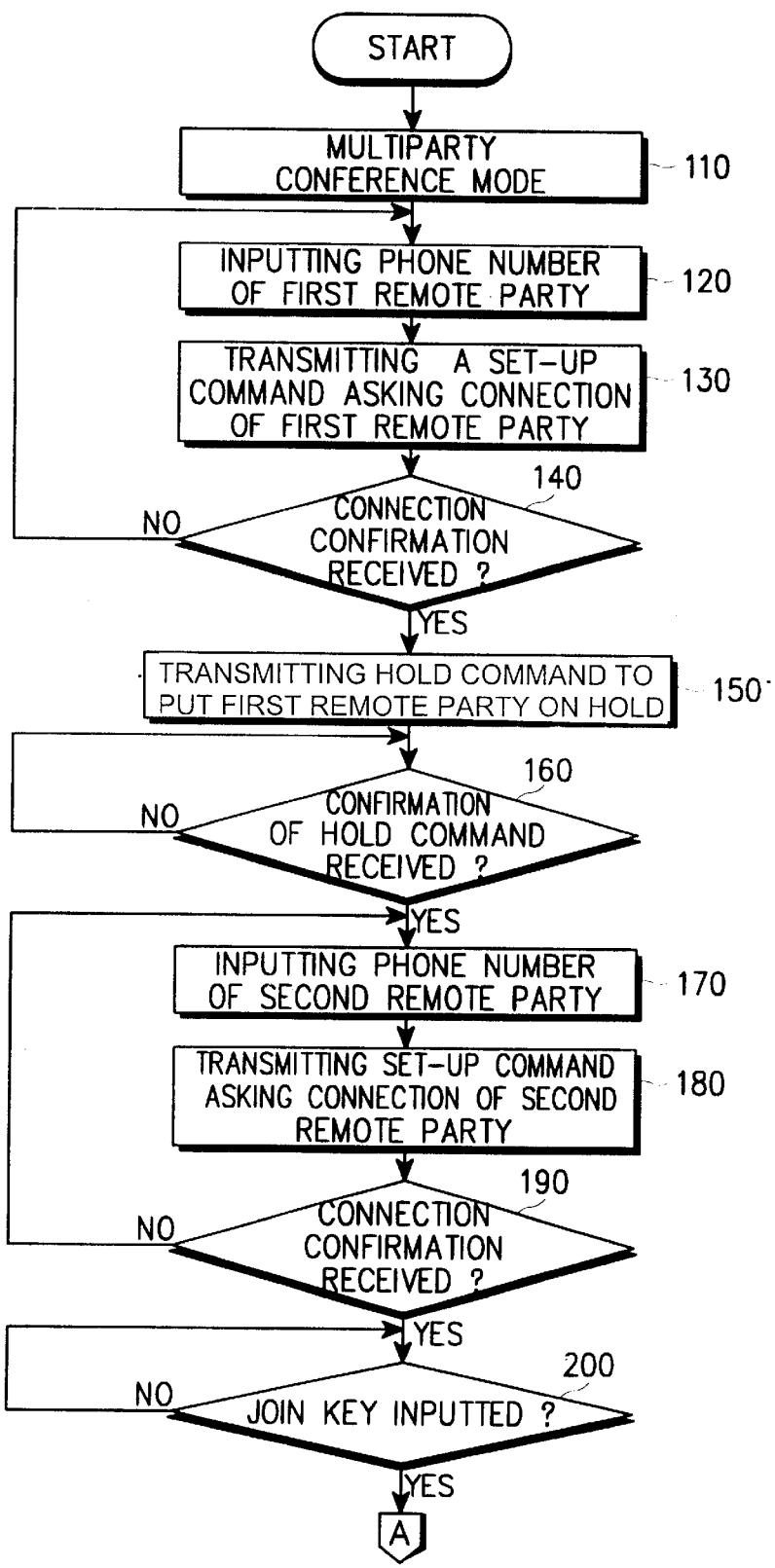
Figure 1B:
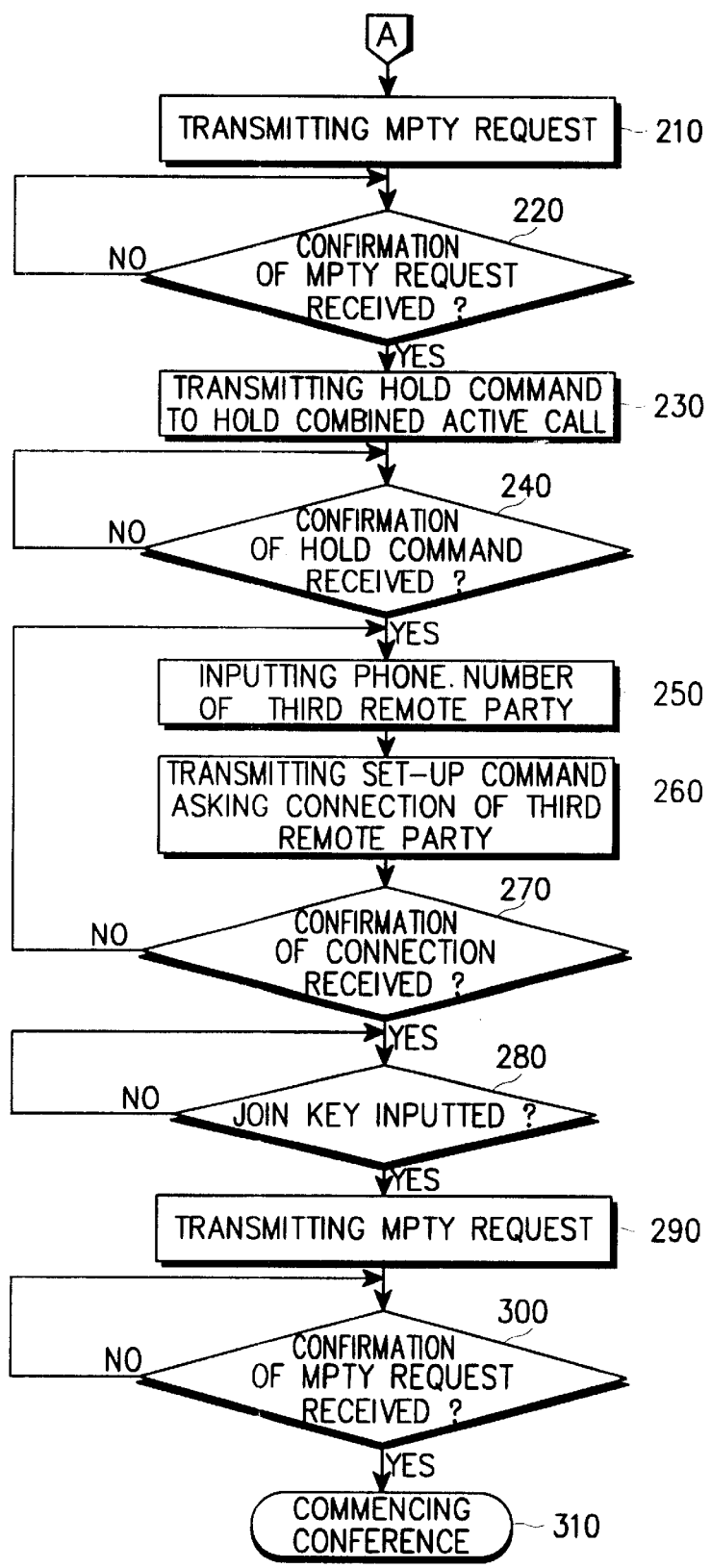

A multiparty conference call on a mobile phone is a conference with multiple remote parties using mobile phone services. FIGS. 1A and 1B illustrate a conventional method for a mobile phone subscriber to have a conference with four remote parties using mobile phone services. In step 110, the conference inviter sets the mobile phone to multiparty conference mode. In response, the mobile phone displays a message requesting the phone number of the first remote party to participate in the conference. After the inviter inputs the phone number of the first remote party in step 120, the mobile phone transmits a set-up command asking for the connection of the first remote party to the service network in step 130.

Upon receiving the connection confirmation from the service network in step 140, the inviter inputs a hold command asking the network to put the first remote party on hold in step 150. If there is no confirmation of connection at step 140, the process returns to step 120. Subsequently receiving the confirmation of the hold command at step 160, the inviter inputs the phone number of the second remote party at step 170. At step 180, a set-up command asking for the connection of the second remote party to the service network is transmitted. After receiving in step 190 the connection confirmation from the service network, the inviter inputs a join key through a menu in step 200. If there is no connection confirmation, the process returns to step 170.

Continuing through block A to FIG. 1B, once the inviter inputs the join key, the mobile phone transmits, in step 210, a multiparty conference request (MPTY request) to the service network, which joins the previous call, now holding, of the first remote party and the present active call of the second remote party to form a combined active call. Receiving the confirmation of the MPTY request from the service network in step 220, the mobile phone transmits, in step 230, a hold command asking the network to hold the combined active call. Receiving, in step 240, the confirmation of the hold command from the network, the inviter inputs the phone number of the third remote party at step 250, so that, at step 260, the mobile phone transmits a set-up command asking the connection of the third remote party to the network.

Upon receiving the confirmation of the connection, at step 270, the inviter inputs a join key, at step 280, resulting in the mobile phone transmitting, at step 290, an MPTY request to the network, which joins the previous combined active call, now on hold, and the present active call of the third remote party to form a final combined active call. If there is no confirmation at step 270, the process returns to step 250. Upon receiving confirmation of the MPTY request from the network at step 300, the mobile phone commences the actual multiparty conference at step 310. Thus, the conventional method of making a multiparty conference call requires laborious series of manual ley pressing in order to connect all the parties participating the conference.

SUMMARY OF THE INVENTION

It is an object of the present invention to provide a method of making a mobile phone automatically invite multiple parties for a remote conference by storing them in the mobile phone beforehand.

According to the preferred embodiment of the present invention, a method of making a mobile phone invite multiple remote parties for a remote multiparty conference through a mobile phone service network, comprises the steps of: setting the mobile phone to multiparty conference mode; searching a subscriber table in which is stored the multiple remote parties to find out what phone numbers to call; transmitting a set-up command asking for the connection of the first remote party to the network; holding the connection upon receiving confirmation from the network; transmitting another set-up command asking for the connection of the next remote party to the network; transmitting a multiparty conference request (MPTY request) to the network to join the present active call of the next remote party with the previous call on hold of the first remote party upon receiving confirmation of the next or second remote party's connection from the network; holding the joined call of the first and second remote parties; repeating the previous fifth to seventh steps until joining the last numbered remote party; and commencing the multiparty conference.

The preferred embodiment of the present invention will now be described more specifically with reference to the drawings attached only by way of example.

BRIEF DESCRIPTION OF THE ATTACHED DRAWINGS

Figure 2A:
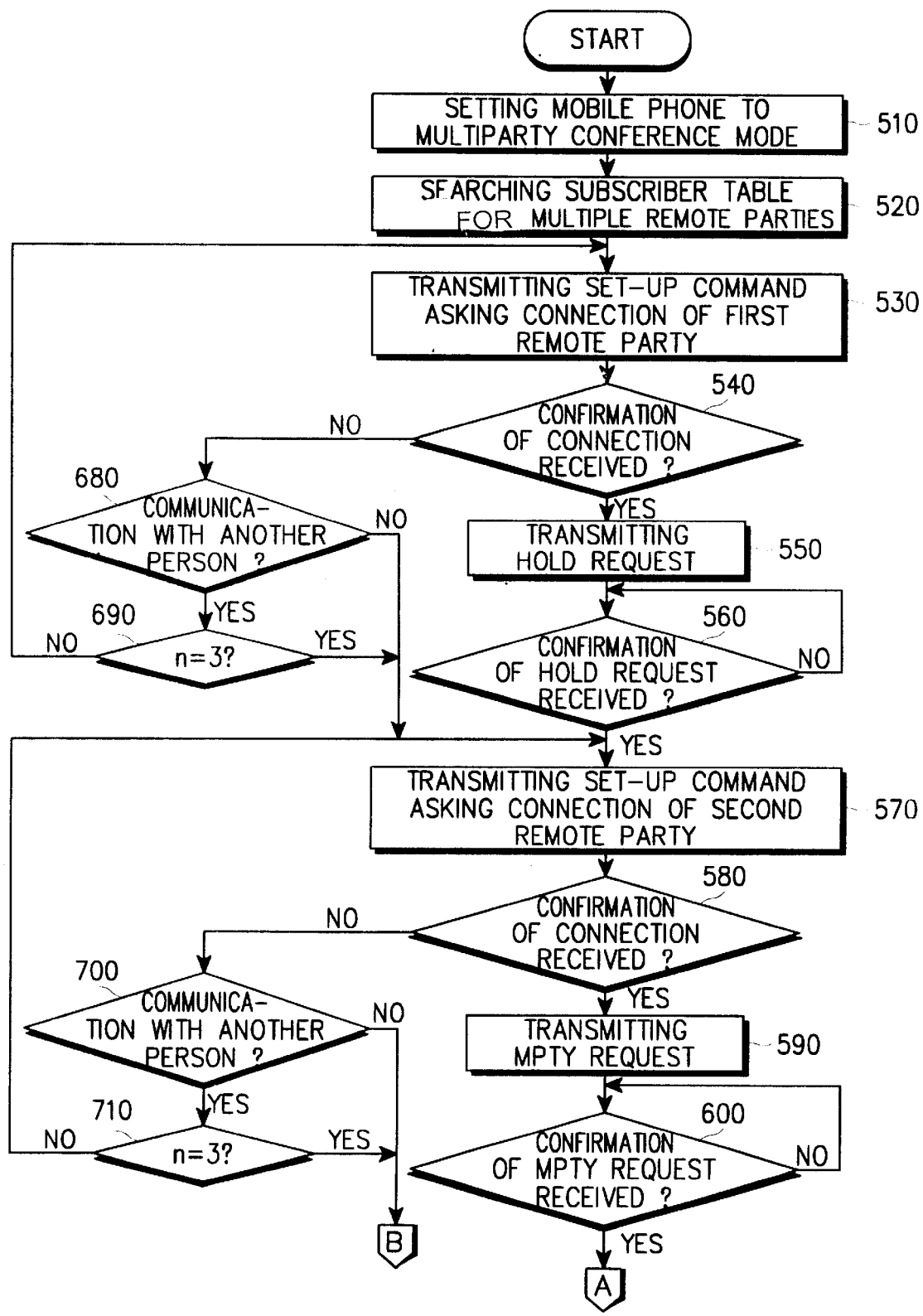
Figure 2B:
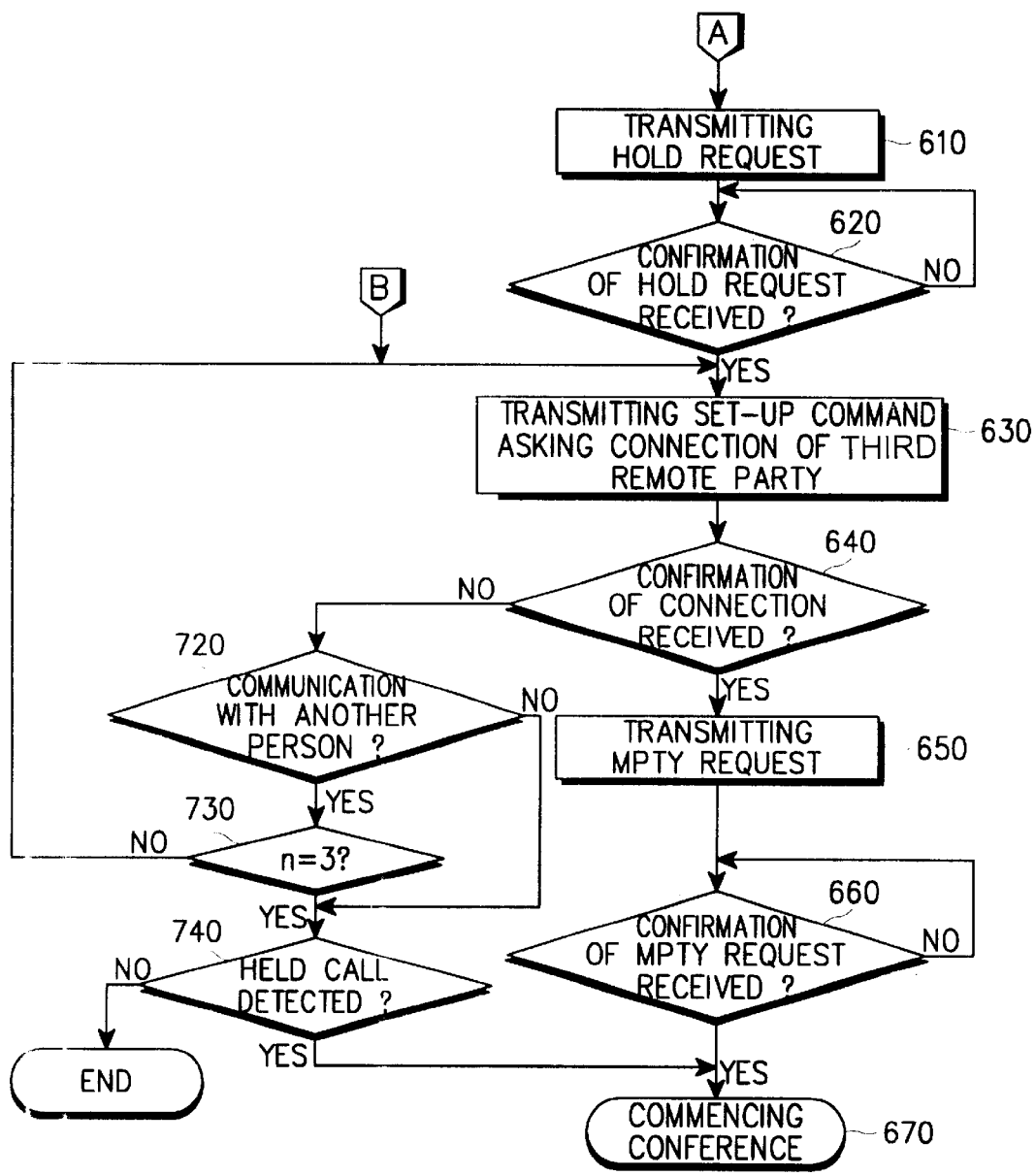

FIGS. 1A and 1B are flow charts illustrating the conventional method of having a remote multiparty conference through a mobile phone; and FIGS. 2A and 2B are flow charts illustrating a method of making a mobile phone invite multiple remote parties for a remote multiparty conference through a mobile phone service network.

DETAILED DESCRIPTION OF THE PREFERRED EMBODIMENT

Although the flow chart of FIGS. 2A and 2B describes the process of making a remote multiparty conference participated by four remote parties, it should be noted that the number of remote parties participating in the conference may be increased or decreased as desired according to the preferred embodiment of the present invention.

Referring to FIGS. 2A and 2B, the inviter sets the mobile phone to the multiparty conference mode in step 510. Then, in step 520, the mobile phone searches a subscriber table in which are stored the multiple remote parties to find out what phone numbers to call. In step 530, a set-up command is transmitted asking for the connection of the first remote party to the network. Then, upon receiving confirmation of the set-up command generated from the network in step 540, the mobile phone transmits a hold request for the network to hold the connection in step 550.

However, if the phone does not receive the confirmation at step 540, the process goes to step 680 to check whether the first remote party is in communication with another person. If the first remote party is in communication with another person, the mobile phone repeats the transmission of the set-up command asking for a connection (steps 530, 540, 680 and 690) by a predetermined number of times, e.g., three times, which is checked in step 690. If the transmission of the set-up command has been repeated three times in vain at step 690 or the remote party is not in communication with another person at step 680, the mobile phone excludes the first remote party from the multiparty conference, proceeding to step 570 to transmit a setup command asking for connection of the next remote party to the network.

Continuing after step 550, the mobile phone checks for network confirmation of the hold request at step 560. Upon receiving the confirmation, the mobile phone transmits another set-up command asking for the connection of the second remote party to the network at step 570. Then, the mobile phone checks for network confirmation of the connection in step 580. If there is no network confirmation, the process goes to step 700 to check whether the second remote party is in communication with another person. If the second remote party is in communication with another person, the mobile phone repeats the transmission of the set-up command asking for a connection (steps 570, 580, 700 and 710) by a predetermined number of times, e.g., three times, which is checked in step 710. If the transmission of the set-up command has been repeated three times in vain at step 710 or the second remote party is not in communication with another person at step 700, the mobile phone excludes the second remote party from the multiparty conference, proceeding through point B to FIG. 2B transmit a set-up command asking the connection of the next remote party to the network at step 630.

Returning to step 580 on FIG. 2A, if the confirmation is received, the mobile phone transmits, at step 590, an MPTY request to join the present active call of the second remote party with the previous call, now holding, of the first remote party to form a combined active call. Then, the mobile phone checks at step 600 for the confirmation of the MPTY request. Continuing the process on FIG. 2B, upon receiving the confirmation, the mobile phone transmits a hold request for the network to hold the combined active call at step 610.

Upon receiving the confirmation of the hold request from the network at step 620, the mobile phone transmits a set-up command asking for the connection of the third remote party to the network at step 630. Then, in step 640, the mobile phone checks for network confirmation of the set-up command. If there is n network confirmation, the process goes to step 720 to check whether the third remote party is in communication with another person. If the third remote party is in communication with another person, the mobile phone repeats the transmission of the set-up command asking for a connection (steps 630, 640, 720, and 730) by a predetermined number of times, e.g., three times, which is checked in step 730. If the repetition of the transmission of the set-up command has been repeated three times in vain at step 730 or the second remote party is not in communication with another person at step 720, the mobile phone excludes the third remote party from the multiparty conference, proceeding to step 740 to check for the existence of a call presently on hold. If a call on hold is detected, the multiparty conference commences at step 670, or, if no call is detected, the process is terminated.

Returning to step 640, if network confirmation is received, the mobile phone transmits, at step 650, an MPTY request to join the present active call of the third remote party with the previous call now holding, of the first and second remote parties to form a combined active call. Then, the mobile phone checks, at step 660, for confirmation of the MPTY request. Upon receiving the confirmation, the process proceeds to commence the remote multiparty conference at step 670. Thus, the mobile phone, according to the preferred embodiment of the present invention, may automatically make a multiparty conference without laboriously pressing a number of keys.

While the present invention has been described in connection with a preferred embodiment as shown in the attached drawings, it will be readily appreciated that various changes and modifications may be made thereto without departing from the scope and spirit of the present invention.

What is claimed is:

1. A method of making a mobile phone invite multiple remote parties for a remote multiparty conference through a mobile phone service network, comprising the steps of:

storing multiple remote parties calling information in a subscriber table;

setting said mobile phone to a multiparty conference mode;

retrieving the multiple remote parties calling information from the subscriber table;

searching a subscriber table to find out what phone numbers to call;

transmitting a set-up command asking for connection of a first remote party to said network;

holding the first party connection upon receiving network confirmation of the first party connection;

transmitting another set-up command asking for connection of a next remote party to said network;

transmitting a multiparty conference request to join the present active connection of the next remote party with the holding connection of the first remote party upon receiving network confirmation of the next remote party connection;

putting the joined connection of said first and next remote parties on hold;

repeating the previous seventh to ninth steps until joining the last remote party; and commencing said multiparty conference.

2. A method as defined in claim 1, including the further steps of:

repeating the transmission of a set-up command asking for connection of one of the multiple remote parties by a predetermined number of times upon not receiving network confirmation of the connection of said remote party because said remote party is in communication with another person; and excluding said remote party from said multiparty conference when the transmission of said set-up command has been repeated a predetermined number of times in vain or said remote party is not in communication with another person.

3. A method of making a multiparty conference call on a mobile phone, comprising the steps of:

a) storing calling information of remote multiple parties;

b) transmitting a set-up command requesting connection of a first remote party;

c) receiving a confirmation of connection set-up;

d) putting the connection on hold;

e) transmitting a set-up command requesting connection of a next remote party;

f) receiving a confirmation of connection set-up;

g) transmitting a multiparty conference request to join a previous connection with a present connection;

h) putting the joined connection on hold; and i) repeating steps e)–h) until connection set-up has been attempted for all of the remote multiple parties.

4. The method as defined in claim 3, wherein the initiating step further comprises the steps of:

retrieving the stored calling information;

establishing an order of calling; and setting up the multiparty conference call.

* * * * *